(12) United States Patent
Qiu et al.

(10) Patent No.: US 9,228,109 B2
(45) Date of Patent: Jan. 5, 2016

(54) GLOSSY IMPROVED APPEARANCE AUTO-DEPOSITION COATING, AND METHODS OF APPLYING SAME

(71) Applicant: HENKEL AG & CO. KGAA, Duesseldorf (DE)

(72) Inventors: Xueting Qiu, Shanghai (CN); Manesh Nadupparambil Sekharan, Midland, MI (US); Omar Abu-Shanab, Rochester Hills, MI (US); William E. Fristad, Rochester Hills, MI (US); Girdhari Kumar, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/803,618

(22) Filed: Mar. 14, 2013

(65) Prior Publication Data
US 2013/0266814 A1  Oct. 10, 2013

Related U.S. Application Data

(63) Continuation of application No. PCT/US2011/065459, filed on Dec. 16, 2011.

(60) Provisional application No. 61/425,229, filed on Dec. 20, 2010.

(51) Int. Cl.
*B32B 15/08* (2006.01)
*C08L 63/00* (2006.01)
*C09D 163/00* (2006.01)
*C09D 163/10* (2006.01)

(52) U.S. Cl.
CPC ............. *C09D 163/00* (2013.01); *C08L 63/00* (2013.01); *C09D 163/10* (2013.01); *C08L 2205/05* (2013.01); *Y10T 428/31529* (2015.04)

(58) Field of Classification Search
CPC .................................................. C09D 163/10
USPC ......................................... 428/418; 523/400
See application file for complete search history.

(56) References Cited

U.S. PATENT DOCUMENTS

| | | |
|---|---|---|
| 3,063,877 A | 11/1962 | Schiffman et al. |
| 3,585,084 A | 6/1971 | Steinbrecher et al. |
| 3,592,699 A | 7/1971 | Steinbrecher et al. |
| 3,674,567 A | 7/1972 | Bradley et al. |
| 3,791,431 A | 2/1974 | Steinbrecher et al. |
| 3,795,546 A | 3/1974 | Hall et al. |
| 4,030,945 A | 6/1977 | Hall et al. |
| 4,108,817 A | 8/1978 | Lochel, Jr. |
| 4,178,400 A | 12/1979 | Lochel, Jr. |
| 4,180,603 A | 12/1979 | Howell, Jr. |
| 4,186,226 A | 1/1980 | Smith |
| 4,234,379 A | 11/1980 | Conway et al. |
| 4,234,704 A | 11/1980 | Sakanaka |
| 4,242,379 A | 12/1980 | Hall et al. |
| 4,289,826 A | 9/1981 | Howell, Jr. |
| 4,636,264 A | 1/1987 | Schellenberg et al. |
| 4,636,265 A | 1/1987 | Fischer et al. |
| 4,800,106 A | 1/1989 | Broadbent |
| 5,342,694 A | 8/1994 | Ahmed |
| 5,500,460 A | 3/1996 | Ahmed et al. |
| 6,096,806 A | 8/2000 | Mueller et al. |
| 6,613,387 B2 | 9/2003 | Agarwal et al. |
| 7,138,444 B2 | 11/2006 | McGee et al. |
| 2003/0068498 A1 | 4/2003 | Weller et al. |
| 2003/0143405 A1 | 7/2003 | Bammel |
| 2004/0043155 A1 | 3/2004 | McGee et al. |
| 2005/0158646 A1* | 7/2005 | Sugama et al. ............ 430/110.2 |
| 2005/0239954 A1* | 10/2005 | Licht et al. ..................... 524/589 |
| 2006/0167178 A1* | 7/2006 | Kitamura et al. ............. 524/833 |
| 2008/0160199 A1 | 7/2008 | Manesh et al. |
| 2010/0081736 A1* | 4/2010 | Willimann et al. ............. 524/42 |
| 2010/0255328 A1* | 10/2010 | Tomizaki et al. ............. 428/483 |
| 2013/0018127 A1* | 1/2013 | Mestach et al. ................ 523/423 |
| 2014/0234641 A1* | 8/2014 | Kumar et al. .................. 428/457 |

FOREIGN PATENT DOCUMENTS

| | | |
|---|---|---|
| CN | 1051192 A | 5/1991 |
| CN | 101045844 A | 10/2007 |
| WO | 0071337 | 5/2000 |
| WO | 03042275 A1 | 5/2003 |
| WO | 2009-088993 | 7/2009 |

OTHER PUBLICATIONS

International Search Report for PCT/US2011/065459, dated Aug. 30, 2012, 3 pages.

Mark, et al., "Encyclopedia of Polymer Science and Engineering, vol. 6, Emulsion Polymerization to Fibers, Manufacture," 63 pages.

* cited by examiner

*Primary Examiner* — Megan McCulley
(74) *Attorney, Agent, or Firm* — Mary K. Cameron

(57) ABSTRACT

The invention provides an improved appearance, glossy, autodepositing coating composition that maintains its desirable properties such as moisture barrier properties, although it is still able to deliver a glossy finish. No additional coatings are necessary over the instant coating to achieve a gloss. The glossy composition is accomplished by narrowing the molecular weight distribution and the molecular weight of an autodepositing epoxy dispersion coating by adding a chain transfer agent. The chain transfer agent is a thiol-containing compound made from an epoxy resin mixed with at least one ethylenically unsaturated monomer polymerized through a polymerization process, a curing agent, and a starter composition of peroxide, FeF3, and hydrofluoric acid. By eliminating the starter composition, a bath concentrate suitable for selling is manufactured.

27 Claims, 2 Drawing Sheets

GLOSSY IMPROVED APPEARANCE AUTO-DEPOSITION COATING, AND METHODS OF APPLYING SAME

CROSS-REFERENCE TO RELATED APPLICATIONS

This invention claims priority from the U.S. Provisional Application Ser. No. 61/425,229, filed Dec. 20, 2010.

FIELD OF THE INVENTION

This invention relates to autodeposition compositions and processes for generating an improved appearance of a polymeric coating on a metal substrate by chemical reaction between the metal and an autodeposition coating bath. More particularly, the invention relates to glossy coatings generated by an autodeposition coating bath having been modified to provide a smooth, high gloss coating surface finish.

BACKGROUND OF THE INVENTION

Autodeposition has been in commercial use on steel for about thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. Epoxy resin-based autodeposition coating systems are described in U.S. Pat. No. 4,180,603 (Howell. Jr.); U.S. Pat. No. 4,289,826 (Howell Jr.); U.S. Pat. No. 5,500,460 (Ahmed et al.); and International Publication Number WO 00/71337. Epoxy-acrylic blend resins for autodeposition have also been developed as described in U.S. Pat. No. 7,138,444, but these coatings provide a low gloss, semi-matte finish. The disclosures of all these patents and published patent applications are hereby incorporated by reference to the extent that they are not specifically contradicted by the below teachings.

Autodeposition compositions are usually in the form of a liquid, usually aqueous solutions, emulsions or dispersions in which active metal surfaces of inserted objects are coated with an adherent resin or polymer film that increases in thickness the longer the metal remains in the bath, even though the liquid is stable for a long time against spontaneous precipitation or flocculation of any resin or polymer, in the absence of contact with the active metal. When used in the autodeposition process, the composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characteristics, the dispersions from which they are produced and the mechanism by which they deposit are distinctly different. Electrodeposition requires that metal or other objects to be coated be connected to a source of direct current electricity for coating to occur. No such external electric current is used in autodeposition.

Typical autodeposition coatings currently commercially available, including epoxy-acrylic based systems that provide good corrosion resistance, have a low gloss finish and may include surface inconsistencies. In many industries, the low gloss finish of the autodeposition primer was perfectly satisfactory for the application. For example, conventional autodeposition coatings have been used as primers to be subsequently coated with paint in order to achieve a glossy, "show surface" appearance. Such autodeposition primer compositions have been utilized in numerous technical applications, such as automotive components, agricultural machinery, appliances, too numerous to mention here, that require anti-corrosion and proper adhesion properties for subsequent coatings.

In certain applications, the autodeposition coating has been used without the need for topcoating. Generally, due to the low gloss nature of commercially available autodeposition coatings, this use has been limited to non-show surfaces, for example in shock absorbers, automotive seating tracks and the like. Although autodeposition coatings have been utilized for decades in these coating instances, a smooth, glossy, improved appearance with good corrosion and adhesion characteristics was not readily forthcoming. There are incidences where an improved appearance of the autodeposition coating is desired without the need for subsequent coating operations, and this has been an unmet need in the industry.

In the prior art, certain epoxy or epoxy-acrylic resins used for autodeposition applications were generally made by preparing solutions of epoxy resin and acrylic monomer in organic solvent(s). The resulting mixture was dispersed in water with surfactant, mechanically dispersed to a desired particle size and then polymerized. Because a high concentration of solvent is undesirable in an autodepositing coating bath, these solvent-rich emulsions required removal of solvent by distillation techniques known in the art. The resulting polymerized resin could then be mixed with other components and used as a component of an autodeposition coating bath. The bath forms a polymeric coating when autodeposited on a metal surface and cured. Low solvent/no solvent epoxy-acrylic autodeposition coating compositions have been developed which eliminate and/or minimize the need for process solvents, which had caused increased manufacturing costs. However, the appearance of these epoxy-acrylic resin based coatings had some shortcomings such as high surface roughness and low gloss.

As discussed above, previous autodeposition formulations have been limited to applications where a semi-matte, low gloss finish was acceptable. Prior attempts to achieve a glossy, improved appearance have not met with a high degree of success, particularly with epoxy-acrylic compositions. Direct-to-metal or corrosion protection thermoset primers, such as 2-components urethane, 2-components epoxy, and electrodeposited epoxies, are single phase low molecular weight polymeric systems with glossy, smooth finishes due to their low viscosity, but these systems lack edge corrosion performance. While traditional methods of enhancing appearance characteristics of a coating involved the use of flow additives, co-solvents, or plasticizers, among others, those solutions may impact coating volatile organic compound (VOC) content and environmental sustainability.

Previously, the characteristics of the epoxy and acrylic phases of the resin were incompatible, and had contributed to low gloss, matte and textured finish coatings. The present invention seeks to make compatible both phases and in doing so enhances the aesthetic and overall appearance properties of resulting coatings, by increasing gloss and reducing roughness, without loss of corrosion performance and without loss of adhesion to the metal substrate and any later applied coatings. Another aspect of the present invention is that the smoother, glossier coating of the invention may much easier to clean, and can be easily rinsed off by natural conditions on the roadway, thereby possibly lessening corrosion.

Up to now, autodeposition coatings have not been used successfully for automotive, "show" surfaces due to the lack of gloss and smoothness sufficient to meet manufacturer requirements. There has been an unmet need, particularly in the economy automotive market, to reduce the number of layers of paint required to achieve a "show surface without loss of corrosion performance. The coatings of the invention have both higher gloss and smoothness and may be used as a stand alone coating, such as a finish coating. In particular in the economy automotive market, these coatings may be useful for less expensive car body parts thereby providing customers with an attractive, glossy coating at lower cost.

SUMMARY OF THE INVENTION

The present invention addresses these problems and discloses several aspects of new autodeposition compositions and bath chemistries which provided higher gloss and smoother appearance autodeposition coatings, methods of application thereof and coated articles. The autodeposition composition according to the invention comprises modified epoxy-acrylic resin obtained by use of a chain transfer agent which thereby reduced weight average molecular weight and narrowed molecular weight distribution of the resulting resin, which unexpectedly enhanced glossiness and smoothness, while maintaining other desirable properties, such as corrosion and physical performance characteristics, and good moisture barrier properties.

In one aspect of the present invention, disclosed is an epoxy dispersion used in an autodeposition composition that provides the combined properties of an improved glossy appearance and smoothness, with adhesion and corrosion resistance performance to the autodeposition coating. The composition disclosed includes a narrowing of the range of molecular weight distribution. Although this somewhat differs in effect from an overall resulting lower molecular weight polymer, these two effects are interrelated in the present invention. Such a narrower range of molecular weight distribution contributes to the new glossy appearance, without any substantial loss of barrier properties.

Furthermore, this invention teaches new compositions and new methods of making compatible the epoxy and acrylic portions of the epoxy-acrylic hybrid particles in the epoxy dispersion. The instant method enhances the microscopic compatibility between the two phases within the emulsion particles, thus greatly improving the glossiness and smoothness, as well as the overall appearance properties. To achieve the desired results of making compatible the epoxy and acrylic, the inventors first looked at the viscosity characteristics of the high molecular weight thermoplastic acrylic phase as it differs from the low molecular weight thermoset epoxy phase in the mini-emulsion polymerized particles used in the autodeposition composition. Introduction of chain transfer agents (CTA), such as thiol-containing compounds, significantly narrowed the range of molecular weight distribution, and reduced weight average molecular weight, while greatly enhancing asthetic characteristics of the coating, without any negative impact on performance. In this aspect of the invention, the molecular weight distribution is narrowed by dis-couraging high molecular weight polymer formation, thereby narrowing the distribution range to a lower molecular weight range.

In yet another aspect of the present invention, we disclose an autodeposition coating comprising a epoxy-acrylic cross-linked resin coating produced with thiol glycerine modified epoxy-acrylic mini emulsion resin based autodeposition compositions. When compared to coatings formulated with emulsions that contain other CTA additives and/or molecular weight reducing approaches, the present invention provided higher gloss and smoothness at lower thiol glycerine levels.

Further, the mini emulsion polymerization process plays a significant role in achieving the compositions of the invention. The introduction of thiol glycerine into traditional seeded or batched emulsion polymerization approaches did not provide an equivalent smooth and glossy surface as compared to that observed when utilizing the mini-emulsion process. For reasons that are not well-understood, the mini-emulsion process combined with the CTA, in particular the thiol glycerine, provided unexpected synergies in improving gloss and smoothness not otherwise obtained by use of either of these aspects alone.

In other aspects of the present invention, we disclose chemically modified epoxy-acrylic mini-emulsion resin containing compositions using various thiol-containing compounds, including thioglycerol, dodecane thiol, ethane thiol, and/or combinations thereof. The autodeposition coating made with the various thiol-containing compound modified emulsions improves the smoothness and gloss of the autodeposition coating surface. The modified coating composition using thioglycerol improves the flow and leveling of the autodeposition polymer substantially, which helps the coating to cover the areas where the polymer is insufficiently deposited by flowing from surrounding areas.

In one aspect of the invention, the polymer modification described herein allows reduction or elimination of flow additives, plasticizers, and the like from the polymer formulation thereby avoiding side effects such as introduction of VOC's, lowering corrosion performance, or other deleterious effects of the coating systems while using these types of additives.

In another aspect of the invention, a coated metal substrate, preferably comprising a ferrous or zinc metal surface, coated with an autodeposition bath comprising an autodeposition composition according to the invention, preferably a thioglycerol modified emulsion, is provided which has a smoother surface compared to an unmodified version of said emulsion. Desirably, the gloss level of the thioglycerol modified coating is greater than 85 gloss units at 60 degrees incident light, as compared to an unmodified epoxy-acrylic emulsion containing autodeposition coating composition, e.g. Aquence 930, commercially available from Henkel Corporation, Madison Heights, Mich., which showed gloss levels of about 20-30 gloss units at 60 degrees incident light.

As disclosed above, numerous aspects of the present invention involve utilizing various chain transfer agents as modifiers to epoxy-acrylic mini-emulsion autodeposition compositions such as those commercially available from Henkel Corporation of Madison Heights, Mich. as the Aquence 900 Series.

In their investigations, the inventors found that not all chain transfer agents work equally well. For example, testing of trichloromethane, a known chain transfer agent, in the mini emulsion process produced resins whose resulting autodeposition coatings had insufficient gloss and smoothness. Likewise, use of the chain transfer agents with resin production processes, such as conventional seeded emulsion polymerization did not provide much improvement in gloss and smoothness.

Other than in the operating examples, or where otherwise indicated, all numbers expressing quantities of ingredients, reaction conditions, or defining ingredient parameters used herein are to be understood as modified in all instances by the term "about". Unless otherwise indicated, all percentages are percent by weight. Molecular weight is weight average molecular weight, measured by gel permeation chromatography (GPC), unless otherwise specified.

BRIEF DESCRIPTION OF THE DRAWINGS

FIG. 1A shows Gel Permeation Chromatograph (GPC) analysis of the molecular weight distribution range of the resulting coating from Example 7 (TD-3002-BB lot 39090) a control.

FIG. 1B shows Gel Permeation Chromatograph (GPC) analysis of the molecular weight distribution ranges of the resulting coating from Example 4 (XQ3311-152a Emulsion).

FIG. 1C shows Gel Permeation Chromatograph (GPC) analysis of the molecular weight distribution ranges of the resulting coating from Example 2 (XQ3311-152b Emulsion).

FIG. 1D shows Gel Permeation Chromatograph (GPC) analysis of the molecular weight distribution ranges of the resulting coating from Example 6 (XQ3311-122b Emulsion).

FIG. 2A shows Gel Permeation Chromatograph (GPC) analysis of the molecular weight distribution ranges of the resulting coating from Example 3 (3372-137a emulsion; Injection 1; Result Id 15164), a mini-emulsion polymerization product.

FIG. 2B shows Gel Permeation Chromatograph (GPC) analysis of the molecular weight distribution ranges of the resulting coating from Example 9 (3379-64 emulsion; Injection 1; Result Id 15168). This formulation was 3372-137b, similar to Example 3, but made by non-mini-emulsion polymerization

DETAILED DESCRIPTION OF PREFERRED ASPECTS

Figure 1:
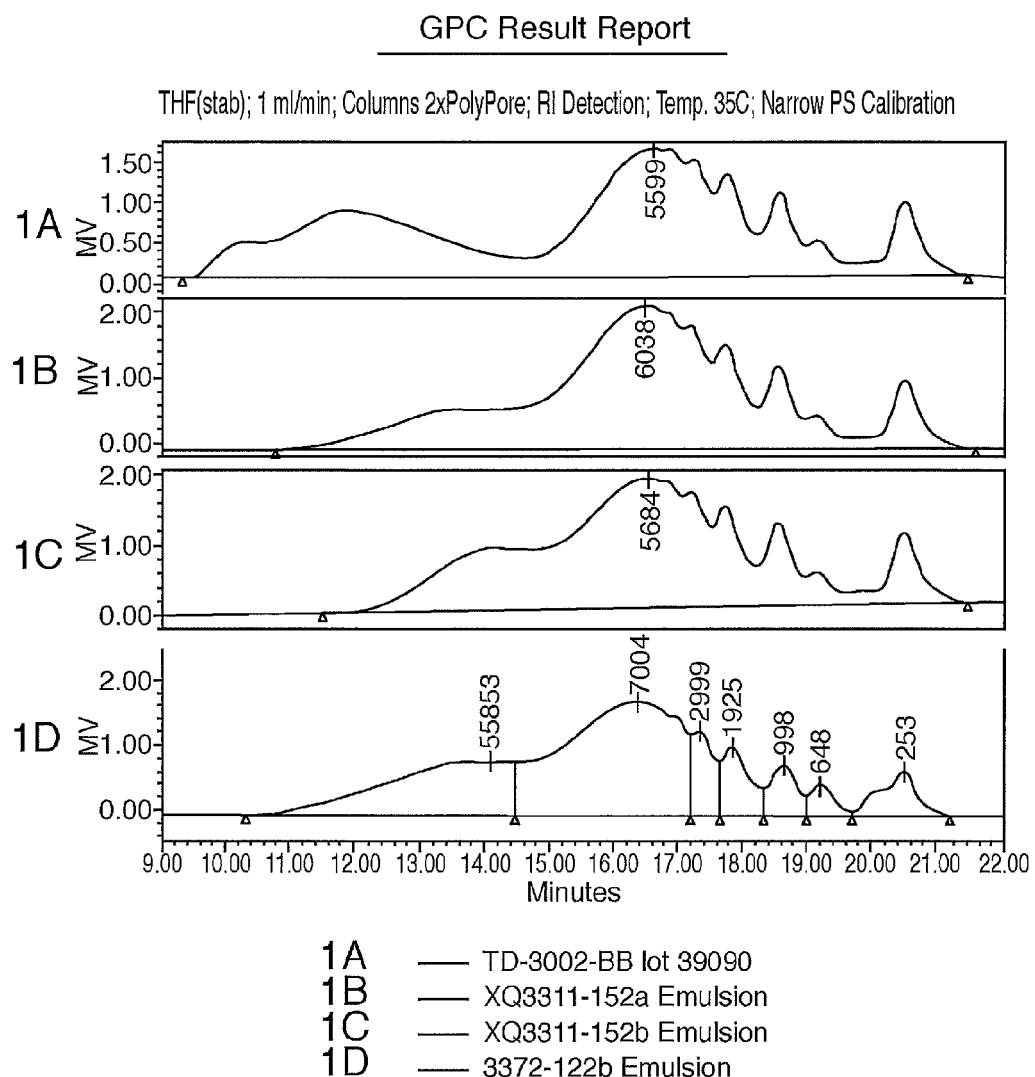
FIG. 1 shows Gel Permeation Chromatograph (GPC) analysis comparing the molecular weight distribution ranges of the resulting coatings from Example 7 (control) to the coatings of Examples 2, 4, and 6.

By combining the mini-emulsion polymerization process of resin production with a thiol-based chain transfer agent, unexpected improvements in gloss and smoothness of the resulting autodeposited coatings were observed. Of special interest, the thiol-containing compounds providing the best results include, but are not limited to, thiol-containing chain transfer agents including thioglycerol, dodecane thiol and ethane thiol.

Thiols are organo-sulfur compounds that are naturally acidic. The functional group of the thiol is a hydroxyl group with a sulfur atom replacing the oxygen atom. In this aspect of the invention, a thiol substituted glycerol acts as a molecular weight distribution reducing compound and may be used to modify many emulsions to provide smooth, high gloss coatings of surfaces. Such a thiol compounds may be utilized as a chain transfer agent, which will significantly reduce the molecular weight and narrow the molecular weight range of distribution, as well as greatly enhance the aesthetic characteristics of the coating without substantial negative impact on the barrier performance.

In one embodiment, a chain transfer agent of thioglycerol was added to the polymerization process, preferably before any surfactant had been added. The autodeposition coating made with the thioglycerol modified emulsion improves the smoothness and gloss of the autodeposition coating surface. The modification using thioglycerol improves the flow and leveling of the autodeposition polymer substantially, which helps the coating to cover any areas where the polymer is insufficiently deposited through improved flow from surrounding areas. The polymer modification by this technique can also help in reducing or eliminating the use of flow additives, plasticizers, etc. from the polymer formulation to improve the flow and smoothness of the autodeposition coating while avoiding side effects such as introduction of VOC's, lowering corrosion performance, etc. of the coating systems while using these type of additives.

The chain transfer agent, for example thioglycerol, may be added to the organic portion of the emulsion (epoxy and ethylenically unsaturated monomer blend) at room temperature. A solvent-less, mini-emulsion was prepared according to the teachings of U.S. Pat. No. 7,138,444, using the above organic blend and was subsequently polymerized to provide an epoxy dispersion useful in making autodeposition compositions suitable for use in autodeposition baths for depositing autodeposition coatings.

The thioglycerol appears to serve a dual purpose where it reacts with the epoxy resin present in the organic portion of the mini-emulsion to provide additional primary hydroxyl groups, while it also appears to act as a chain transfer agent during the polymerization of the ethylenically unsaturated monomers, thereby controlling not only the molecular weight of the acrylic portion which helps to improve the flow, but also reduces the molecular weight distribution range, which gives the glossy appearance. Gel Permeation Chromatography (GPC) analysis of the polymers showed reduction in polymer molecular weight distribution and reduction in weight average molecular weight of the polymer. In some embodiments, there is also a reduction in the amount of high molecular weight species in the polymer with addition of thioglycerol in the formulation.

Although the examples hereinbelow will provide detailed experimental percent by weight inclusions of the various thiol-containing compounds, various aspects of the invention include from 0.1% to 2.0% thioglycerol, from 0.01% to 4.0% dodecane thiol, and 0.01% to 2.0% ethane thiol as being effective components.

The present invention, will be more readily understood by the following description of the components of the epoxy resin-ethylenically unsaturated monomer blend to which the chain transfer agents, including the thiol-containing agents, are added. Suitable epoxy monomer blends find utility when mixed with the molecular weight reducing chain transfer agents that contain thiols, described in more detail hereinbelow. Examples are included to provide disclosure of the full range of applicable thiol-containing modifications to the epoxy monomer blends.

Epoxy resin-ethylenically unsaturated monomer blends according to the invention are made by dissolving or dissolving and dispersing at least one epoxy resin in at least one ethylenically unsaturated monomer, optionally with latent cross-linker and/or coalescing agent, and then adding at least one chain transfer agent.

In accordance with the invention, a process for making an epoxy dispersion comprises the steps of: (a) dissolving an epoxy resin with at least one ethylenically unsaturated monomer to form a mixture and adding a chain transfer agent and any optional components; (b) dispersing the mixture of step (a) in water, optionally with surfactant, to form a crude particle dispersion, mechanically dispersing same to form a mini-emulsion; and (c) polymerizing the at least one ethylenically unsaturated monomer contained in the mini-emulsion to form an epoxy dispersion. The term "epoxy dispersion" as used herein means the dispersion resulting from mini-emulsion polymerization of the epoxy resin-ethylenically unsaturated monomer blend. It will be understood by those of skill in the art that the chain transfer is incorporated into the epoxy dispersion. The type and concentration of epoxy resin and ethylenically unsaturated monomer used can be varied to achieve specific performance properties such as corrosion resistance, flexibility, edge protection. The type and concentration of ethylenically unsaturated monomer used can also be exploited as a means to provide improved compatibility with various pigmentation types.

Epoxy resins useful in the present invention can be based on one or more epoxy resins which contain one or more hydroxyl groups. Such epoxy resins are well known substances and are described, for example, in the chapter entitled "Epoxy Resins" in Volume 6 of The Encyclopedia of Polymer Science and Engineering (Second Edition). Methods of use according to the invention are based on epoxy resins that contain within the same molecule: (i) one or more epoxide groups as well as (ii) one or more hydroxyl groups. Preferably, the epoxy resin used contains one or more hydroxyl groups and approximately two epoxide groups per molecule.

Epoxy resins are often described by the type of central organic moiety or moieties to which the 1,2-epoxy moieties are attached. Non-exclusive examples of such central moieties are those derived from bisphenol A, bisphenol F and their analogs in which one or two —NH2 moieties are substituted for an equal number of —OH moieties in the bisphenol; novolac condensates of formaldehyde with phenol and substituted phenols and their amino analogs, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy resin. Optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Epoxy resins useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy resins derived from bisphenol A in this invention. More particularly, epoxy moiety containing molecules utilized in this invention preferably conform to the general chemical formula:

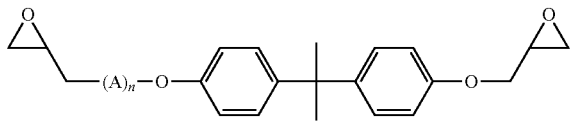

where:

A =

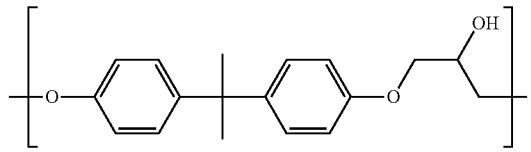

and "n" is an integer from 0 to 50. If such epoxy resins are to be used directly as the resin component of the present invention, "n" is preferably an integer within the range from about 1-30 so that each molecule contains at least one hydroxyl group. Commercially available epoxy resins of this type are normally mixtures of molecules having somewhat different "n" values and different numbers of epoxy groups. Preferably, the epoxy resin mixture used has a number average molecular weight in the range of from about 350 to about 5,000, more preferably in the range from about 400 to about 3000. Preferably, the average number of epoxide groups per molecule in the epoxy resin mixture is in the range from 1.7 to 2.5, more preferably in the range from 1.9 to 2.1. The epoxy resin mixture may contain resin molecules in which n=0.

Other suitable epoxy resins include chain-extended epoxy resins as well as flexibilizing epoxy resins. In the former, a chain extender is utilized to react individual epoxy resin molecules through their epoxy groups so as to form a polymer which is higher in average molecular weight than the starting epoxy resin(s). A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups capable of increasing the flexibility of the cured autodeposited coating such as, for example, long aliphatic chains (e.g., polymethylene chains corresponding, for example, to the structure —(CH$_2$)$_n$— wherein "n" is preferably greater than 3, more preferably greater than 6. The polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure ((CH$_2$)$_n$—CHR-0-)m-, where: "n" is 0-3, "m" is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350.

Suitable ethylenically unsaturated monomers include, but are not limited to, vinyl aromatic hydrocarbons such as styrene and substituted styrenes, vinyl aliphatic hydrocarbons, ethylenically unsaturated acids such as acrylic and methacrylic acid as well as alkyl and hydroxyl-alkyl esters of such acids. Non-exclusive examples include butyl acrylate, methyl methacrylate, and hydroxyethyl methacrylate. Acrylonitrile, methacrylonitrile, acrylamide, and methacrylamide are also suitable. Combinations of any of the above monomers may find utility as well.

Ethylenically unsaturated monomers with anionic functionality are typically used. Anionic functional monomers, when co-polymerized into an emulsion or aqueous solution polymers, provide a "bound" source of ionic charges to effectively stabilize the emulsion polymer particles both during polymerization and subsequent formulation into autodeposition compositions. One advantage offered is to minimize or eliminate the use of an external surfactant. In addition, these anionic functional monomers may provide a "bound" source of sulfate or sulfonate groups to the polymer necessary for autodeposition film formation to occur. Examples of suitable anionic functional monomers include, but are not limited to, 2-sulfoethyl methacrylate, 2-acrylamido-2-methylpropanesulfonic acid, styrene-sulfonic acid, vinylphosphonic acid, phosphate monomers such as PAM-100 and PAM-200 phosphate ester monomers available from Rhodia and corresponding salts of these monomers.

In one embodiment, phosphate monomers such as PAM-100 and PAM-200 available from Rhodia and corresponding salts of these monomers can be used as a portion of the ethylenically unsaturated monomer. The use of phosphate monomers such as PAM-100 and PAM-200 can provide improvements in mechanical and adhesive properties. It is generally preferred for the phosphate monomer(s) to be added after dispersion of the epoxy resin and ethylenically unsaturated monomer and before or during polymerization of the monomer.

In another aspect of the present invention, hydroxyl functional ethylenically unsaturated monomer may be used. The use of hydroxyl functional ethylenically unsaturated monomer provides for a dispersion that has greater solvent resistance when used in conjunction with hydroxyl reactive crosslinking or curing agents. Non-exclusive examples of hydroxyl functional ethylenically unsaturated monomer include 2-hydroxyl methacrylate, hydroxyl acrylate, and hydroxyl propyl methacrylate.

The dispersions and coating compositions of the present invention may also contain one or more substances capable of reacting with the polymer end product to provide a crosslinked polymeric matrix in the cured coating. In one embodiment of the invention, at least a portion of the curing agents (sometimes referred to as crosslinking agents) only react with the epoxy dispersion end-product at the elevated temperatures typically encountered during the curing stage of the composition. Such curing agents are often referred to in the art as "latent" curing agents or hardeners because they only become activated when heated to a temperature well in excess of normal room temperature. The use of latent curing agents is preferred in the present invention so that substantial cross linking of the epoxy resin or epoxy pre-polymer may be avoided prior to and during deposition on the surface of an article. In the case of metallic articles the deposition is typically carried out at temperatures of from about 20.degree. C. to about 60.degree. C. However, if so desired, minor amounts of more reactive curing agents may also be present in addition to the latent curing agents so as to accomplish partial crosslinking prior to deposition on an article. In one embodiment of the invention, at least one latent curing agent such as, for example, a blocked isocyanate is incorporated into the mixture before the at least one ethylenically unsaturated monomer is polymerized. Preferred blocked isocyanates comprise moderately reactive isocyanates such as aliphatic isocyanates and more sterically hindered and/or more acid stable blocking groups, such as those derived from the lactam of 6-aminohexanoic acid and/or benzotriazole. Typical stoving temperatures for such crosslinking agents are at or above 160.degree. C. Utilization of such crosslinking agents avoids premature crosslinking from occurring during the polymerization process where temperatures are typically between ambient temperature and 100.degree. C. Vestagon B1530 from Degussa Corporation is one representative example.

The preferred crosslinking agents are generally selected so as to be capable of reacting with the hydroxyl groups and/or intact epoxide groups, which are present in the epoxy resin and/or ethylenically unsaturated monomer. Hydroxyl groups are inherent to epoxy resins as hydroxyl is formed upon ring opening of the epoxide, independent of whether this ring opening occurs in the advancement of the epoxy resin, or by reaction of residual epoxy with acids such as HF in the coating bath. Hydroxyl groups can also be imparted if hydroxyl functional ethylenically unsaturated monomer is used.

Suitable crosslinking agents used in the present invention react with epoxide or hydroxyl moieties on the reactive epoxy-acrylic polymer in the epoxy dispersion at the elevated temperatures found in the curing stage of the process, e.g., at least 100° C. The preferred crosslinking agents are believed to be reactive with hydroxyl groups as well as with any intact epoxide groups that may still be present in epoxy-acrylic polymer once it has been placed in the relatively acidic environment of an autodeposition bath composition. Most, so or all, of such epoxide groups are believed likely to be hydrolyzed to produce hydroxyl groups. Furthermore, even if epoxy groups remain as such, there will normally be at least some hydroxyl groups available for crosslinking reactions such as esterification, etherification, and urethane formation.

Crosslinking agents are preferably molecules that are capable of rapid chemical addition reactions with epoxy and/or hydroxyl only when heated, but which exhibit little or no reactivity towards such moieties at temperatures preferably of 100° C., 120° C., 130° C., 140° C., 150° C. Such crosslinking agents are sometimes referred to in the art as latent curatives. Examples of suitable crosslinking agents include (a) molecules that contain: at least two epoxy and/or hydroxyl-reactive functional groups, such as thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. The blocking groups can be derived from any suitable aliphatic, cycloaliphatic, aromatic, or alkylaromatic monoalcohol, monoamide, monoamine, or monoxime. Ketoximes are useful when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C.

The use of isophorone diisocyanate-based, epsiloncaprolactam blocked isocyanates as crosslinker, is particularly preferred. If a blocked isocyanate-type crosslinker is utilized, the ratio of blocked isocyanate groups to hydroxy groups (NCO:OH) typically will be in the range of about 0.05 to about 1.2, more preferably about 0.1 to about 0.5. Other examples include blocked hexamethylene diisocyanates (HMDI).

Chain transfer agents, sometimes called modifiers or regulators, act to reduce the molecular weight by only allowing monomers to form chains of relatively short lengths due to chain termination and re-initiation. Chain termination occurs when two free radicals react to form new molecules without any radical ends. Chain transfer occurs when a radical chemically reacts with a non-radical species, resulting in yet another radical species unconnected to the first species. Most commonly, the chain end radical tries to bond with the weaker of the two bonds, and one atom becomes bonded to the chain end. When this happens, the current chain formation is terminated, and a new chain may or may not start, depending on the reactivity of the new radical end. Molecular weight is diminished when these reactions take place, without altering the overall rate of conversion of monomer to polymer.

Many chain transfer agents may be added to the reaction mixture in order to provoke chain termination, including mercaptans, commonly known as thiols. Representative of suitable thiols for these various aspects of the present invention include, but are not limited to, various thiol-containing compounds, particularly thiol glycerine, dodecane thiol, and ethanol thiol, among others. Combinations of these chemicals may also find utility in some applications. These chain transfer agents may be employed at concentrations of the thiol-containing compounds in the epoxy resin-ethylenically unsaturated monomer blend, in increasing order of preference, of at least about 0.01, 0.2, 0.30 0.32, 0.34, 0.35, 0.36, 0.38, 0.40, 0.5, 0.6, 0.7, 0.8, 0.9 or 1.0% and not more than in increasing order of preference, 10.00, 9.00, 8.0, 7.0, 6.0, 5.0, 4.0, 3.0, 2.0, 1.5% each of these ranges being based on emulsion solids. If too much chain transfer agent is used, the epoxy dispersion may be unstable in the autodeposition bath. If too little is used the desired effect of making compatible the epoxy resin and the ethylenically unsaturated monomer in the epoxy dispersion will not be achieved.

When utilizing a deliberate addition of thiol-containing compounds in order to reduce molecular weight, concentration of the thiol-containing compound can be, in increasing order of preference, at least about 0.01% and not more than 10.00%, yet especially in increasing order of preference, about 0.1% to about 1.00%, each of these ranges being based on emulsion solids. Depending upon the additional use of initiators, the amount of chain transfer agent may be reduced provided that the increase in initiator concentration is not so great as to adversely affect corrosion performance.

Desirably sufficient quantities of at least one chain transfer agent are present sufficient to narrow the molecular weight distribution such that, in increasing order of preference, at least 75, 77, 80, 82, 84, 85, 86, 87, 88, 89, 91, 92, 93, 94, or 95% by weight of said polymer lies in a range of between about 25,000 to 1,000 Daltons, measured as weight average molecular weight.

In one embodiment, the effect of use of chain transfer agents herein is shown by the reduction in amount of high molecular weight species, specifically species having molecular weights in excess of 250,000 Daltons are to less than 3% by weight in the resulting epoxy dispersion. In contrast, the prior art epoxy dispersions according U.S. Pat. No. 7,138,444 contain approximately 33% by weight of such species.

Generally, the presence of a coalescing agent component in an autodeposition composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by anti-pollution laws in many locations and also have been found to be more likely than monoethers of propylene glycol to destabilize the emulsions formed in products according to the invention, such that monoethers of propylene glycol, particularly the n-butyl and phenyl monoethers of propylene glycol, are preferred from this class. When glycol monoethers are used, their percentage in an autodepositing liquid composition according to the invention preferably is within the range from about 5 to about 30, preferably about 18 to 26% of the total solids in the composition.

Monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethy-1,3-pentanediol mono 2-methyl propionate. This and other monoesters if used preferably are present in an amount of at least 0.5% of the total autodepositing liquid composition and more preferably are present in amounts of about 1-10, and preferably about 2.5-5%.

Dispersion of the epoxy pre-polymer and ethylenically unsaturated monomer in water can be accomplished by procedures known in the art. In one embodiment, the dispersion of the epoxy pre-polymer and ethylenically unsaturated monomer in water is accomplished by emulsification. Emulsification of the epoxy pre-polymer and ethylenically unsaturated monomer in water may be accomplished by any of the emulsification procedures known in the art. The desired result is a fine particle dispersion of epoxy pre-polymer and ethylenically unsaturated monomer containing micelles. Other desired coating components and additives may be emulsified with the epoxy pre-polymer and ethylenically unsaturated monomer.

In one embodiment, the emulsification procedure involves a two-stage process in which a solution of the epoxy pre-polymer, ethylenically unsaturated monomer, and any added components, is emulsified in water to form a crude dispersion of epoxy pre-polymer and ethylenically unsaturated monomer containing micelles. The crude dispersion is then mechanically dispersed to form a fine particle dispersion. In one embodiment, the crude dispersion is subjected to at least one particle size refinement stage. For example, the crude dispersion can be subjected to at least one particle size refinement stage in which the crude dispersion is forced through a narrow aperture to form the fine particle dispersion.

In one embodiment the epoxy pre-polymer, ethylenically unsaturated monomer, and any added components is microfluidized or homogenized in a microfluidizer or homogenizer having a chamber pressure of from about 6,000 psi to about 15,000 psi. As used herein, "microfluidized" and "homogenized" refer to a mechanical process for reducing the size of the droplets of the epoxy pre-polymer, ethylenically unsaturated monomer, and any added components. The epoxy pre-polymer, ethylenically unsaturated monomer, and any added components form droplets in the water. The average diameter of the droplets is from about 1 to 10 microns prior to microfluidization or homogenation. The average diameter of the epoxy pre-polymer, ethylenically unsaturated monomer, and any added components droplets is reduced to less than about 1 micron during microfluidization or homogenization. Preferably, the average diameter of the droplets is reduced to about 0.01 to about 0.5 microns during microfluidization or homogenation. During the microfluidization, the mixture containing the epoxy pre-polymer, ethylenically unsaturated monomer, any added components, and water is preferably passed through small channels under a pressure of from about 8,000 psi to about 12,000 psi at a speed of approximately 700 ft/sec. The interaction intensity, which involves shear, impingement, distention, and cavitation forces, on the mixture with the microfluidizer or homogenizer controls the size and distribution of the droplets in the mixture and ultimately the size of the polymer particles.

A preferred microfluidizer is available from Microfluidics Corporation. Preferred homogenizers are available from APV invensys. In the Microfluidics microfluidizer, a mixture is pumped into a specially designated chamber in which fluid sheets interact at ultrahigh velocities and pressures up to 1500 ft/second and 16,000 psi, respectively. The fixed microchannels within the chamber provide an extremely focused interaction zone of intense turbulence causing the release of energy amid cavitation and shear forces. Most preferably, the Microfluids microfluidizer is set at 8,000 to 12,000 psi chamber pressure.

In one embodiment, an emulsifying agent, such as a surfactant, is used to further or aid in the formation of the dispersion in water. Anionic surfactants are generally preferred, although amphoteric as well as nonionic surfactants may also be utilized. Combinations and mixtures of different surfactants may be employed. One class of preferred anionic surfactants for use in the present invention are ether sulfates that conform to general formula:

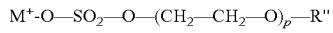

wherein: M represents a monovalent cation or monovalent fraction of cation of higher valence, preferably, sodium or ammonium, more preferably ammonium; p is a positive integer that preferably is between 2 and 7; and R" represents an alkyl or alkylaryl moiety, more preferably an alkyl phenol moiety. Independently, R" preferably has 8 30 and more preferably has 15 20 carbon atoms. Other suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate), and Polystep™ B40 from Stepan.

The single most preferred anionic emulsifying agents are salts of lauryl sulfate. The preferred amount of active anionic emulsifying agent is from about 0.1 to about 5 wt % based on the weight of the total composition of solids and is preferably from about 0.7 to about 2 wt %. In one embodiment a polymerizable anionic surfactant is used to further or aid in the formation of the dispersion in water. Polymerizable anionic surfactants are widely known in the industry. Requirements for polymerizable anionic surfactants used in the present invention are that they possess anionic surfactant structure in addition to a group capable of participating in radical polymerization. Utilization binds the surfactant to the polymer in the dispersion, which improves stability and reduces levels of free surfactant required. Non-exclusive examples of polymerizable anionic surfactants include sodium allyloxy hydroxypropyl sulfonate, and propenyl modified nonylphenol ethoxylate sulfate salts such as Hitenol A-10, Hitenol BC-10 and Hitenol BC-05 (products of DKS International, Inc.). Hitenol BC-10 and Hitenol BC-05 are particularly preferred.

In accordance with the purpose of the invention, as embodied and broadly described herein, the invention comprises a process for making an epoxy dispersion, the process comprising the steps of: (a) forming the epoxy resin-ethylenically unsaturated monomer blend; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c).

Essentially any type of free radical generator can be used to initiate polymerization of the monomers. For example, free radical generating chemical compounds, ultraviolet light or radiation can be used. A radical initiator may be added to facilitate the polymerization of the ethylenically unsaturated monomer within the epoxy containing micelle of the dispersion. Relative degrees of grafting, if any, between epoxy pre-polymer and polymerized monomer can be achieved to provide for specific molecular weights and specific performance ends by careful selection of initiator type. Initiators may be added at various points in the process of forming the dispersion. In one embodiment, the initiator is organic soluble and is introduced in the organic phase prior to dispersion of the epoxy pre-polymer and ethylenically unsaturated monomer in water. In another embodiment, the initiator is water-soluble and is introduced after dispersion of the epoxy pre-polymer/ethylenically unsaturated monomer mixture in water. In another embodiment both organic soluble initiators and water-soluble initiators are added. In another embodiment an organic soluble initiator is introduced after the aqueous dispersion is formed. In this embodiment, the organic soluble initiator is added directly or dissolved in a co-solvent and dripped into the dispersion.

Non-exclusive examples of suitable organic soluble initiators include peroxides, peroxy esters as well as organic soluble azo compounds. Benzoyl peroxide is one preferred example. Non-exclusive examples of suitable water-soluble initiators include hydrogen peroxide, tert-butyl peroxide, t-butyl peroxtoate, hydroperoxides such as t-butyl hydroperoxide, alkali metal (sodium, potassium or lithium) or ammonium persulfate; azo initiators such as azobisisobutyronitrile or 2,2'-azobis(2-amidinopropane)dihydrochloride; or mixtures thereof. Ammonium persulfate and Vazo 68 WSP (Available from E.I. DuPont de Nemours) are two preferred examples. In one embodiment such initiators may also be combined with reducing agents to form a redox system. Non-exclusive examples of reducing agents include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Non-exclusive examples of redox systems include: t-butyl hydroperoxide/sodium formaldehyde sulfoxylate/Fe (III); t-butyl hydroperoxide/isoascorbic acid/Fe(III); and ammonium persulfate/sodium bisulfite/sodium hydrosulfite/Fe(III). In another embodiment, sodium formaldehyde sulfoxylate is used to initiate polymerization in conjunction with at least one anionic surfactant, such as sulfates and sulfonates in the absence of peroxides. Incorporation of anionic endgroups resulting from this method provides an increased level of stability for the emulsion as well as the corresponding autodeposition bath. Nonylphenol ethoxylate sulfate ammonium salt and sodium lauryl sulfate are two suitable non-exclusive examples.

In one embodiment, the polymerization of the ethylenically unsaturated monomer is carried out with applied heat. A wide variety of temperatures can be employed and the specific optimum temperature varies with each initiator. Generally, persulfates are processed at a temperature from about 75 to about 90.degree. C. Process temperatures for peroxides and azo compounds are generally chosen such that the half-life decomposition rate falls from about 1 to about 120 minutes. Alternatively, redox initiation methods are widely known in the art by which polymerization can be conducted at ambient or near ambient conditions.

A solvent may be used as a medium for combining the epoxy resin, ethylenically unsaturated monomer, crosslinking agent(s), and added components. The solvent component is not believed in most cases to contribute any desirable characteristic to the final autodeposition compositions. The solvent component may be removed from the emulsion by distillation under reduced pressure. However, in many cases the solvents do not diminish the technical benefits of the final autodeposition compositions according to the invention and may be left in place in the autodeposition composition. Any such residual solvent will normally be expelled during the elevated temperatures found in the curing stage at the end of the autodeposition process. Optional solvents are mixtures of (i) aromatic hydrocarbons with from 6 to 10 carbon atoms and (ii) ketones with from 3 to 8 carbon atoms. Preferably, the amount of solvent used to mix the materials is at least 10 wt % of the combined weight of the components without water. The most preferred solvents are toluene and methyl isobutyl ketone (MTBK).

An autodeposition composition according to the invention comprises epoxy dispersion as described herein in water and may also contain a number of additional ingredients. Such additional ingredients include fillers, biocides, foam control agents, pigments and soluble colorants, and flow control or leveling agents. The compositions of these various components maybe selected in accordance with the concentrations of corresponding components used in conventional epoxy resin-based autodeposition compositions, such as those described in U.S. Pat. Nos. 5,500,460, and 6,096,806 and U.S. Ser. No. 09/578,935, the teachings of which are hereby incorporated by reference.

Suitable flow control additives or leveling agents include, for example, the acrylic (polyacrylate) substances known in the coatings art such as the products sold under the trademark MODAFLOW™ by Solutia, as well as other leveling agents such as BYK-310 (from BYK-Chemie), PERENOL™ F-60 (from Henkel), and FLUORAD™ FC-430 (from 3M).

Pigments, filler components or soluble colorants may generally be selected for compositions according to this invention from materials established as satisfactory for similar uses in other autodepositing liquid compositions. Suitable materials include carbon black, phthalocyanine blue, phthalocyanine green, quinacridone red, hansa yellow, and/or benzidiac yellow pigment, oxidizer and acid stable titanium dioxide and the like.

To prepare an autodeposition coating bath composition suitable for coating a metallic substrate by autodeposition, the epoxy dispersion described hereinabove may be combined with at least one autodeposition accelerator component, which is capable of causing the dissolution of active metals (e.g., iron) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. The autodeposition accelerator component is preferably chosen from the group consisting of hydrofluoric acid and its salts, fluorosilicic acid and its salts, fluorotitanic acid and its salts, ferric ions, acetic acid, phosphoric acid, sulfuric acid, nitric acid, hydrogen peroxide, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/l, (c) a source of hydrogen ions in an amount sufficient to impart to the autodeposition composition a pH that is at least 1.6 and not more than about 5, and, optionally, (d) hydrogen peroxide.

Hydrofluoric acid is preferred as a source for both the fluoride ions as well as the proper pH. Ferric fluoride can supply both fluoride ions as well as dissolved trivalent iron. Accelerators comprised of HF and FeF3 are especially preferred for use in the present invention.

A coating process according to this invention will preferably comprise the steps of: (a) contacting an object with an active metal surface with the aforedescribed autodeposition composition for a sufficient time to cause the formation of a film of the pre-polymer (which film may also contain certain other components of the autodeposition bath composition, particularly the crosslinker of a predetermined thickness on the metal surface, (b) separating the coated metal surface from contact with the autodeposition bath composition, (c) rinsing the coated metal surface to remove at least some of the absorbed but otherwise unadhered components of the bath composition from the more adherent portion of the coating, and (d) heating the rinsed surface to form a final cured coating. Without wishing to be bound by theory, it is believed that when the wet adherent coating is heated, the epoxy resin and crosslinker present in the epoxy dispersion react to form a thermoset polymeric matrix.

Ordinarily a metal surface preferably is degreased and rinsed with water before applying an autodeposition composition. Conventional techniques for cleaning and degreasing the metal surface to be treated according to the invention can be used for the present invention. The rinsing with water can be performed by exposure to running water, but will ordinarily by performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns).

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality final films, the corrosion resistance of the cured coating may be further improved by rinsing with an aqueous solution comprising an alkaline earth metal compound such as calcium nitrate as described in co-owned U.S. Pat. No. 6,613,387 and which are incorporated herein by reference in their entirety.

Final heating of the rinsed wet coated and optionally post-treated autodeposited film is preferably at a temperature of greater than 100° C. The curing temperature must be sufficiently high so as to effect reaction of the latent crosslinker with the epoxy- and hydroxyl-reactive functional groups of the epoxy dispersion present in the autodeposited film. Generally, the final heating temperature is selected to dry and cure the coating at a temperature within the range from at least about 100° C. to about 300° C., more preferably between about 130° C. and 1 240° C., for a time of about 3 to about 60 minutes, more preferably for about 10 to about 30 minutes.

The heating can be performed in multiple stages, if desired. For example, in a first stage lasting from about 5 to about 15 minutes, the coated substrate is heated to a peak temperature of about 55° C. to about 65° C. to flash off most of the residual water in the coating and in a second stage lasting from about 30 to about 50 minutes, the coated substrate is heated to a peak temperature of about 175° C. to about 195° C. The peak temperature preferably is attained in preferably, no more than about 10 minutes after the first heating stage has been completed.

Coatings according to the invention are also compatible with co-cure processes wherein a paint is applied to a dewatered uncured autodeposited coating and the two layers are cured together, see for example WO 2009088993.

Autodeposition compositions employed in the present invention can be used for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

By reducing the molecular weight of the polymerized compound, the coating can be wetted out and a glossier appearance results. As described above in the Background of the Invention, there are many new applications for a glossy autodeposited composition coating, especially for vehicles made in developing countries where all they want is the autodeposition coating, nothing to follow. In those cases, if a glossy autodeposition coating can be good enough for their standards, the present invention can deliver.

ASTM Standard Test D523 is the standard test to measure glossiness. In the examples below, you will notice the gloss values with respect to 60°, and this is a measurement value coming from the ASTM D523 test method which is used to evaluate the difference in gloss of dried films of emulsion floor polishes when the light reflected at a 60° angle is measured. This test method covers the determination of the 60° specular gloss of films after application to a substrate. Specular gloss is one of several related appearance attributes that produce the sensation of glossiness.

EXAMPLES

A method of preparing a base of autodeposited mini-emulsion, coating bath, and processing and evaluating the resulting substrates is shown below using Aquence 900 Series mini-emulsion commercially available from Henkel Corporation, utilizing polymerization procedures, as follows:

To a clean, 2-liter, 4-necked flask, equipped with agitator, nitrogen inlet, condenser and addition funnel was added a) 171.4 grams of epoxy resin (ER) (solid epoxy resin with epoxy equivalent weight around 900), and b) 21.8 grams of blocked isocyanate (BI)(caprolactam blocked isocyanurate of isophorone diisocyanate) were added to the flask. A homogeneous mixture of c) 56.5 grams of styrene (STY), d) 51.0 grams n-butyl acrylate (BA), e) 2.8 grams of methacrylic acid (MAA), f) 6.4 grams of hydroxyl ethyl methacrylate (HEMA), g) 54.5 grams of methyl methacrylate (MMA), and h) 14.6 grams of Ester alcohol (2,2,4-Trimethyl-1,3-pentanediol monoisobutyrate Propionic acid) (EA) was added to the flask and mixed until the epoxy resin (solid epoxy resin with epoxy equivalent weight around 900)(ER) and the blocked isocyanate (caprolactam blocked isocyanurate of isophorone diisocyanate)(BI) were dissolved. A homogeneous mixture of i) 16.8 grams of anionic surfactant (ammonium lauryl sulfate) (ALS) @28% NV and j) 578.1 grams of deionized water (DI) were added to the flask over a period of 10 minutes with mixing. The crude dispersion was removed from the flask and passed through an M-110F Microfluidizer® (a product of Microfluidics Corporation) at 9000 to 10,000 psi to form a fine particle dispersion mini-emulsion of between 100 nm and 500 nm, where an average particle size was measured to be ~250 nm.

The fine particle dispersion or mini-emulsion was loaded into a two (2) liter flask under nitrogen atmosphere equipped with an agitator, condenser and a nitrogen inlet, along with addition funnels. Then, k) 0.25 grams of 1% ferrous sulfate, l) 0.12 grams of sodium formaldehyde sulfoxylate (SFS) and in) 5.0 grams of deionized water mixture were added respectively into the flask with mixing and then the contents of the flask was heated to 55° C. A mixture of n) 1.2 grams of sodium formaldehyde sulfoxylate and o) 10.2 grams of deionized water was then added to the flask at a uniform rate over a period of three hours. Midway through the addition period, a mixture of p) 1.8 grams of t-butyl hydroperoxide (t-B), and q) 10.2 grams of deionized water was added at a uniform rate over a period of 3 hours. During these additions, the contents of the flask were then heated to 65° C.

Once the addition was complete, the flask contents were maintained at 65° C. for a period of one hour. The final measured solids were 36.4% by weight.

One (1) Liter Coating Bath Preparation:

In a first step to create an epoxy/acrylic anionically modified emulsion plus carbon black pigment slurry, 120.0 g of epoxy/acrylic anionically modified emulsion had 4.4 g of black pigment slurry @ 40.5% solids added to it, and the materials were allowed to mix for 10-60 minutes. Then, an autodeposition bath was formulated in a 1.0 liter container, to which was added 40.0 g of commercially available Starter 300 (including hydrogen peroxide, FeF$_3$, and HF) and 833.6 g of deionized water (DI), slowly under agitation. Finally, we added the remaining amount of water, and mixed the bath for one hour while maintaining the bath under agitation at all time, while measuring and adjusting bath parameters. The bath parameters were:

| | |
|---|---|
| Redox Value | 275-425 mV |
| Lineguard 101 meter reading | 100-350 microamperes |
| Total % non-volatile | 1-10% |
| Wet coating solid | 20-50% |
| Starter titration | 5-40 ml |
| Bath temperature | 20-25° F. |
| Conductivity | 1,200-4,500 micro Siemens |

Coating:

Following standard procedures for coating Panels: Cold Rolled Steel (CRS) panels were coated in the bath as follows:
A. Cleaning
B. Warm Water rinsing
C. Deionized water rinsing
D. Treating with Aquence Processing bath
E. Water rinsing
F. Treating with Aquence® Reaction Rinse The panels were oven cured at 50-200° C. for 10 to 40 minutes oven time.

Evaluating:

The process for evaluating the panels is as follows:
Dry Film Thickness was CRS 15-25 μm
Film Gloss Measurements:

Gloss is measured with Horiba Gloss meter @ 600; higher value indicated glossier finish. To measure the gloss readings in the results of the Examples, a gloss measuring unit utilizes standard ASTM D1455 and/or D523 test procedures, and we followed those procedures. To measure the gloss under various circumstances, we could send an incident light at a 60, 20 or 85 degree angle.

The relative values can be measured as follows:
High Gloss >80, and preferably >90,
Medium Gloss >40,
Low gloss Matte finish <30

| Gloss Range with 60° Gloss Meter | Angle of Measurement of Incident Light |
|---|---|
| If Semi Gloss −10 to 70 GU | 60° |
| If High Gloss >70 GU | 20° |

Film Smoothness Measurements:

Film Smoothness was measured with a roughness checker, i.e. a Sortronic 25 by Taylor Hobson Precision. Smoothness value Ra is measured in micrometer (μm). Lower values indicate smoother finish.

TABLE 1

| | a | b | c | d | e | f | g | h | i | j | k | l | m | n | o | p | q |
|---|---|---|---|---|---|---|---|---|---|---|---|---|---|---|---|---|---|
| | ER | BI | STY | BA | MAA | HEMA | MMA | EA | ALS | DI | $Fe^{2+}$ | SFS | DI | SFS | DI | T-B | DI |
| grams | 171.4 | 21.8 | 56.5 | 51 | 2.8 | 6.4 | 54.5 | 14.6 | 16.8 | 580 | 0.1 | 0.05 | 5 | 1.1 | 20 | 1.56 | 20 |

A bath concentrate may be prepared similar to the bath composition, but does not include any peroxide, $FeF_3$, or hydrofluoric acid, included as part of the commercially available "Starter 300" for sales or shipping. The bath concentrate may be made the same as the coating composition, but it is otherwise made without these three chemicals included. Rather, all the chemicals listed hereinabove with reference to the coating composition would be included except for the Starter 300 components, i.e. the peroxide, $FeF_3$, and/or hydrofluoric acid. That can be added to the concentrate and diluted with water to make the bath composition for autodepositing in accordance with the present invention. The concentration of the concentrate may be anywhere from 2 to over 20 times as concentrated as the bath composition.

For each example, the emulsion process, coating preparation procedures and coating application proceeded as described above, except as otherwise stated. Having these parameters in mind, we now look to the examples as modified in accordance with the present invention:

Example 1 (3311-54)

In this example, we added a modifier of thiol glycerine to modify the molecular weight distribution of a base mini-emulsion (Aquence 900 Series from Henkel Corporation, as described above) with 0.5% thiol glycerine.

2.0 g mercaptan (thiol glycerine) (TG) was added to the process right before item (i) anionic surfactant (ammonium lauryl sulfate)(ALS) and (j) (DI water) and was allowed to continue mixing for more than 10 minutes. The rest of the emulsion process, coating preparation procedures and coating application proceeded as described above.

Results on cured coated panels:
Gloss (60°): 92
Ra value: 0.3 μm

Example 2 (3311-152 b)

In this example, we added a new concentration of modifier of thiol glycerine to modify the mini-emulsion with 0.35% thiol glycerine.

1.42 g thioglycerine was added right before item i and j addition and allow mixing for more than 10 minutes. Results on cured coated panels: Gloss (60°): 92
Ra value: 0.3 μm Example 3 (3372-137 a)

In this example, we added a different concentration of modifier of thiol glycerine to modify the mini-emulsion with just 0.2% thiol glycerine (0.2% TG). See Table 2.

TABLE 2

| | a | b | c | d | e | f | g | h | i | j | k | l | m | n | o | p | q |
|---|---|---|---|---|---|---|---|---|---|---|---|---|---|---|---|---|---|
| | ER | BI | Sty | BA | MAA | HEMA | MMA | EA | SLS | DI | $Fe^{2+}$ | | | SFS | DI | T-B | DI |
| grams | | | 120 | 84 | 6 | 15 | 75 | 12 | 4.5 | 450 | 0.1 | | | 1.2 | 25 | 1.71 | 25 |

Following the same process as Example 1, although Item (i) was switched to a different anionic surfactant (sodium dodecylbenzene sulfonate)(SDS). Results on cured coated panels:
Gloss (60°): 90
Ra value: 0.5 μm Example 4 (3311-152a)

In this example, we added a new modifier of dodecane thiol to modify the mini-emulsion with 0.7% dodecane thiol. See Table 3.

TABLE 3

| | a ER | b BI | c Sty | d BA | e MAA | f HEMA | g MMA | h EA | i | j DI | k $Fe^{2+}$ | l SFS | m DI | n SFS | o DI | P T-B | q DI |
|---|---|---|---|---|---|---|---|---|---|---|---|---|---|---|---|---|---|
| grams | 171.4 | 21.8 | 58.8 | 53.1 | 2.9 | 6.9 | 56.7 | 14.6 | | 400 | 0.1 | 0.05 | | 0.75 | 20.0 | 1.2 | 20.0 |

In addition, Item (i) was replaced with 16.3 g sodium lauryl sulfate sodium—Anionic Surfactant (sodium lauryl sulfate) (SLS). 2.6 g Dodecane thiol (Aldrich) was added right before items (i) and (j) were added and mixed for more than 10 minutes. Results on cured coated panels:
  Gloss (60°): 68
  Ra value: 0.5 μm Example 5 (3311-133a)

In this example, we added a new modifier of ethanol thiol to modify the mini-emulsion with 0.25% ethanol thiol. See Table 4.

TABLE 4

| | a ER | b BI | c Sty | d BA | e MAA | f HEMA | g MMA | h EA | i | j DI | k $Fe^{2+}$ | l SFS | m DI | n SFS | o DI | p T-B | q DI |
|---|---|---|---|---|---|---|---|---|---|---|---|---|---|---|---|---|---|
| Grams | 121.8 | 22.7 | 58.8 | 35.4 | 1.9 | 4.5 | 37.8 | 10.1 | | 400 | 0.1 | 0.05 | | 0.75 | 20.0 | 1.2 | 20.0 |

Again, Item (i) was replaced with 12.8 g anionic Surfactant (sodium lauryl sulfate)(SLS), and 0.63 g ethane thiol was added right before items (i) and (j) were added and mixed for more than 10 minutes. Results on cured coated panels:
  Gloss (60°): 49
  Ra value: 0.8 μm Example 6 (3372-122b)

In this example, we added an initiator and a reducer to modify the mini-emulsion with higher tertiary-Butyl hydrogen peroxide initiator and ascorbic acid reducer (Vc). See Table 5.

TABLE 5

| | A ER | B BI | c Sty | d BA | e MAA | f HEMA | g MMA | h EA | i ALS | j DI | k $Fe^{2+}$ | l | m DI | n Vc | o DI | p T-B | q DI |
|---|---|---|---|---|---|---|---|---|---|---|---|---|---|---|---|---|---|
| Grams | 171.4 | 21.8 | 56.5 | 51.0 | 2.8 | 6.4 | 54.5 | 14.6 | 15.7 | 580 | 0.24 | | | 3.6 | 30.0 | 5.1 | 30 |

Items (n) and (p) were replaced by 3.6 gram ascorbic acid and 5.1 g t-Butyl hydrogen peroxide. Results on cured coated panels:
  Gloss (60°): 75
  Ra value: 0.47 μm Example 7 (Control 39090. No Chain Transfer Agent (CTA)

TABLE 6

| | a ER | b BI | c Sty | d BA | e MAA | f HEMA | g MMA | h EA | i | j DI | k $Fe^{2+}$ | l SFS | m DI | n SFS | o DI | p T-B | q DI |
|---|---|---|---|---|---|---|---|---|---|---|---|---|---|---|---|---|---|
| Grams | 171.4 | 21.8 | 56.5 | 51.0 | 2.8 | 6.4 | 54.5 | 14.6 | | 578.1 | 0.2 | 0.1 | 1 | 1.2 | 10.2 | 1.8 | 10.2 |

Results on cured coated panels:
Gloss (60°): 10-20
Ra value: 1.0-1.4 μm

Example 8

FIG. 1 shows Gel Permeation Chromatography (GPC) analysis comparing the molecular weight distributions of Example 7, a comparative example, to Examples 2, 4 and 6. Note that the molecular weight distribution of the control composition of Example 7 in the top chart, FIG. 1A, shows an undesirably large distribution, while the three (3) Examples 4, 2 and 6, respectively in downward order, FIGS. 1B, 1C, and 1D, show a much tighter distribution of molecular weights (MW's).

GPC results shows that the modification in Examples 2, 4 and 6 provided significant reduction in molecular weight and polydispersity, or distribution of the molecular weights relative to the control of Example 7. See Table 7, comparing the low molecular weight to the molecular weight distribution:

TABLE 7

|  | Molecular Wt. (Daltons) | Polydispersity (Daltons) |
|---|---|---|
| Control | 100,000 | 47 |
| Thiol addition | 16,000 | 8 |

Example 9

3372-137b formulation, identified as 3379-64 composition due to different polymerization process, with (0.2% mercaptan (thiol glycerine)(TG) was added into a regular seed emulsion (i.e. non-mini-emulsion) polymerization.

Regular Seed (i.e. Non-Mini-Emulsion) Preparation:

One gram anionic surfactant (sodium dodecylbenzene sulfonate) (SDS) and 300 grams deionized water was added to a clean, two (2) liter, 4-necked flask, equipped with an agitator and a nitrogen inlet. A mixture of 4.0 gram Butyl acrylate, 3.0 g methyl methacrylate, and 5.0 g styrene was loaded into the abovementioned flask and agitated for 10-20 minutes. Then, we dissolved 0.3 g sodium persulfate in 10.0 g deionized water and added that mixture into the above flask. The flask was heated to 75 C. for 30 to 60 minutes under a nitrogen blanket.

Pre-Emulsion Preparation:

Weigh 80.0 g BA, 72.0 g MMA, 115.0 g sty, 6.0 g MAA, 15.0 g HEMA, 0.67 TG 90, 3.5 g anionic surfactant (sodium dodecylbenzene sulfonate)(SDS), 185.0 g DI water, and 1.14 g t-BHPO in a clean container (One gallon HDPE plastic). Mix well and shake vigorously until a relatively stable pre-emulsion is formed.

Reducer feed: Dissolve 0.8 g SFS into 25.0 g DI water and put into a syringe automatic feeding pump.

Chaser: Dissolve 0.2 g SFS in 5.0 g water, 0.28 g t-BHPO in 5.0 g DI water in separate beakers.

Polymerization:

Feed pre-emulsion and reducer over a 3-hour feed period with a separate feeding pump into a flask under 60° C. Hold for 30 minutes once feeds are finished. Add chaser over a 10 minute period. Hold an additional 2 hours @ 60° C. Emulsion % NV was 35.8. Results on cured coated panels:
Gloss (60°): 62
Ra value: 1.04 μm Example 3 and Example 9 were prepared using the same monomer composition. Both contained thiol glycerine at the same loading. On the other hand, the emulsions were prepared using different processes, i.e. mini-emulsion versus regular seeded (i.e. non-mini-emulsion) polymerization.

TABLE 8

| Emulsion | Process | Peak MW (Daltons) | % Area | Gloss at 60° (GU) | Ra value (μm) |
|---|---|---|---|---|---|
| Ex. 3 3372-137a | Mini-emulsion polymerization | 108345 | 97.55 | 90 | 0.5 |
| Ex. 9 3379-64 | Regular seed (i.e. non-mini-emulsion) polymerization | 100328 | 97.77 | 62 | 1.04 |

Figure 2:
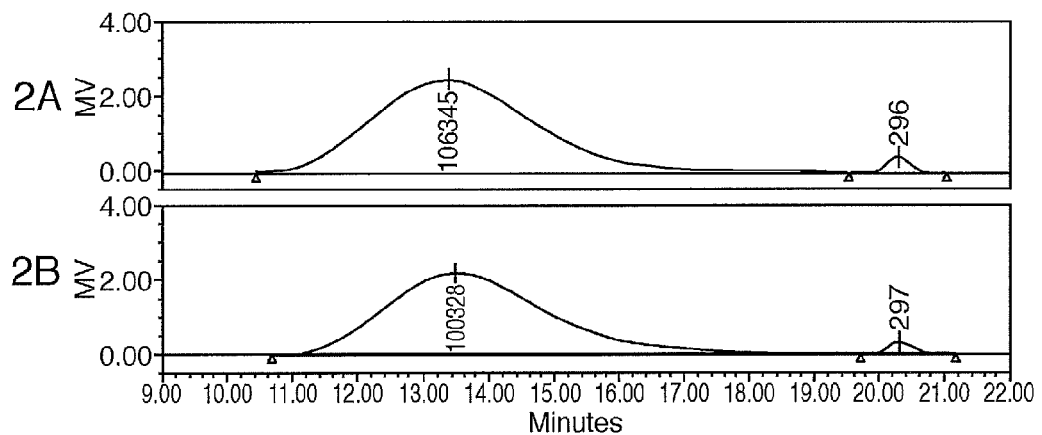
FIG. 2 shows Gel Permeation Chromatograph (GPC) analysis comparing the molecular weight distribution ranges of the resulting coatings from Example 3 to Example 9.

FIG. 2: Gel Permeation Chromatograph (GPC) analysis comparing the molecular weight distribution ranges of the resulting coatings from Example 3 to Example 9 shows that Example 3 coating gives a much higher gloss reading and smaller Ra value, meaning a smoother surface. The results of our experiments show that the glossiness and smoothness of the resultant coating of the present invention is greatly enhanced over the control composition. The gloss values were consistently over 90 GU, and the chart above shows that these values would be considered as "high gloss". This value of high gloss represents a new composition that is suitable and desirable for making glossy autodeposition coatings, without compromising the other desirable properties, including moisture barrier protection. This is very advantageous for some applications.

What is claimed is:

1. An improved appearance autodepositing composition, comprising:
    at least one epoxy dispersion comprising: (i) a solid epoxy resin; (ii) a polymer comprising at least one type of ethylenically unsaturated monomer polymerized in the presence of (i) the solid epoxy resin dissolved in said monomer and at least one chain transfer agent through a mini-emulsion polymerization process; (iii) optionally at least one latent curing agent, and (iv) optionally a coalescing agent;
    water; and
    wherein molecular weight distribution of said epoxy dispersion is such that at least 75% by weight of said epoxy dispersion lies in a range of between about 25,000 to 1,000 Daltons, measured as weight average molecular weight.

2. The composition of claim 1, wherein said epoxy resin is derived from one or more epoxy resins conforming to the general chemical structure:

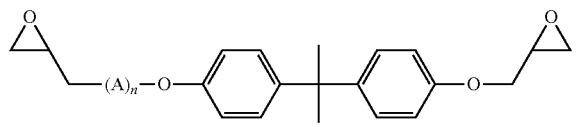

where:
A =

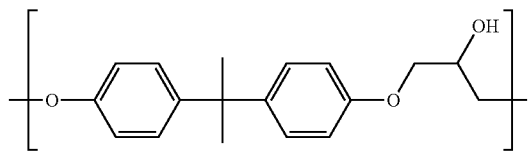

and n is 0 or an integer between 1 and 50.

3. The composition of claim 1, wherein said type of ethylenically unsaturated monomer is selected from the group consisting of vinyl aromatic hydrocarbons, vinyl aliphatic hydrocarbons, ethylenically unsaturated acids, alkyl esters of ethylenically unsaturated acids, hydroxyl-alkyl esters of ethylenically unsaturated acids, and combinations thereof.

4. The composition of claim 1, wherein said chain transfer agent is selected from the group consisting of thiol-containing compounds present in a concentration of about 0.01 wt. % to 10.00 wt. %.

5. The composition of claim 4, wherein said thiol-containing compounds are selected from the group consisting of thiol glycerine, dodecane thiol, ethanol thiol, and combinations thereof.

6. The composition of claim 4, wherein said thiol-containing compounds are selected from the group consisting of thiol glycerine, dodecane thiol, ethanol thiol and combinations thereof present in a concentration of the thiol-containing compounds of at least about 0.03 wt. % and not more than 5.00 wt. %.

7. The composition of claim 1, wherein the epoxy dispersion contains less than 3% by weight of species having molecular weights in excess of 250,000 Daltons.

8. The composition of claim 1, wherein said chain transfer agent comprises one or more of:
   a. from 0.1% to 2.0% thioglycerol;
   b. from 0.01% to 4.0% dodecane thiol; and
   c. 0.01% to 2.0% ethane thiol.

9. The composition of claim 1, wherein the coalescing agent is present in the composition and comprises one or more glycol monoethers present in an amount of about 5 wt % to 30 wt % of total solids in the composition.

10. The composition of claim 1, wherein the coalescing agent is present in the composition and comprises one or more glycol monoesters present in an amount of about 0.5 wt % to 10 wt % of total solids in the composition.

11. The composition of claim 1, said type of ethylenically unsaturated monomer is selected from the group consisting of styrene, substituted styrenes, vinyl aliphatic hydrocarbons, acrylic acid, methacrylic acid, butyl acrylate, methyl methacrylate, hydroxyethyl methacrylate, acrylonitrile, methacrylonitrile, acrylamide, methacrylamide, and combinations thereof.

12. An improved appearance autodepositing coating bath composition, comprising:
   at least one epoxy dispersion comprising: (i) an epoxy resin; (ii) a polymer comprising at least one type of ethylenically unsaturated monomer polymerized in the presence of (i) the epoxy resin and at least one chain transfer agent through a mini-emulsion polymerization process; (iii) optionally at least one latent curing agent, and (iv) optionally a coalescing agent;
   water; and
   an accelerator component which is capable of causing dissolution of active metals from a metallic substrate surface in contact with the bath composition present in a concentration effective to impart to the bath composition an oxidation-reduction potential that is at least 100 millivolts more oxidizing than a standard hydrogen electrode;
   wherein molecular weight distribution of said epoxy dispersion is such that at least 75% by weight of said epoxy dispersion lies in a range of between about 25,000 to 1,000 Daltons, measured as weight average molecular weight.

13. The composition of claim 12, wherein said epoxy resin is derived from one or more epoxy resins conforming to the general chemical structure:

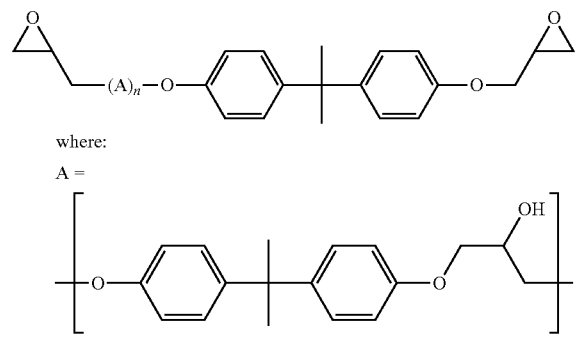

where:

A = and n is 0 or an integer between 1 and 50.

14. A method of coating a metallic substrate with an autodepositing epoxy-based coating composition to impart a glossy appearance, comprising:
   coating a metallic substrate accomplished in a bath by first cleaning the substrate, and rinsing with water followed by a deionized water rinsing step;
   treating with the autodeposition bath composition of claim 12 and water rinsing;
   optionally treating with a reaction rinse; and
   oven curing at an elevated temperature of 50 to 200° C. for a time period from 10 to 40 minutes oven time to form a coated metal substrate.

15. The method of claim 14, wherein the accelerator component comprises fluoride ions and said chain transfer agent is selected from the group consisting of thiol glycerine, dodecane thiol, ethanol thiol, trichloromethane, and combinations thereof.

16. The method of claim 14, wherein said chain transfer agent comprises one or more of:
   a. from 0.1% to 2.0% thioglycerol;
   b. from 0.01% to 4.0% dodecane thiol; and
   c. 0.01% to 2.0% ethane thiol.

17. The method of claim 14, wherein the coalescing agent is present in the composition and comprises one or more glycol monoethers present in an amount of about 5 wt % to 30 wt % of total solids in the composition.

18. The method of claim 14, wherein the coalescing agent is present in the composition and comprises one or more glycol monoesters present in an amount of about 0.5 wt % to 10 wt % of total solids in the composition.

19. The composition of claim 12, wherein the accelerator component comprises fluoride ions and said chain transfer agent is selected from the group consisting of thiol glycerine, dodecane thiol, ethanol thiol, trichloromethane, and combinations thereof.

20. The composition of claim 12, wherein said chain transfer agent comprises one or more of:
   a. from 0.1% to 2.0% thioglycerol;
   b. from 0.01% to 4.0% dodecane thiol; and
   c. 0.01% to 2.0% ethane thiol.

21. The composition of claim 12, wherein the coalescing agent is present in the composition and comprises one or more glycol monoethers present in an amount of about 5 wt % to 30 wt % of total solids in the composition.

22. The composition of claim 12, wherein the coalescing agent is present in the composition and comprises one or more glycol monoesters present in an amount of about 0.5 wt % to 10 wt % of total solids in the composition.

23. An autodeposition composition for use in an autodeposition bath, comprising:
- at least one epoxy dispersion comprising:
  - epoxy-acrylic hybrid particles containing: (i) an epoxy resin; (ii) a polymer comprising at least one type of ethylenically unsaturated monomer polymerized in the presence of (i) the epoxy resin and at least one chain transfer agent through a mini-emulsion polymerization process;
  - (iii) optionally at least one latent curing agent, and
  - (iv) optionally a coalescing agent; and
- water;
- said chain transfer agent being present in an amount sufficient to compatiblize molecular weight of epoxy and acrylic portions of the epoxy-acrylic hybrid particles via chain termination in the ethylenically unsaturated monomer polymerization resulting in greater smoothness and gloss of autodeposition coatings made with said epoxy dispersion as compared to a similar epoxy dispersion in the absence of chain transfer agent.

24. The autodeposition composition of claim 23, wherein said at least one chain transfer agent is selected from the group consisting of thiol-containing compounds present in a concentration of about 0.01 wt. % to 10.00 wt. %.

25. The composition of claim 24, wherein said thiol-containing compounds are selected from the group consisting of thiol glycerine, dodecane thiol, ethanol thiol and combinations thereof present in a concentration of the thiol-containing compounds of at least about 0.03 wt. % and not more than 5.00 wt. %.

26. The autodeposition composition of claim 23, wherein the at least one epoxy dispersion contains less than 3% by weight of species having molecular weights in excess of 250,000 Daltons.

27. The composition of claim 23, wherein said at least one chain transfer agent comprises one or more of:
   a. from 0.1% to 2.0% thioglycerol;
   b. from 0.01% to 4.0% dodecane thiol; and
   c. 0.01% to 2.0% ethane thiol.

* * * * *

UNITED STATES PATENT AND TRADEMARK OFFICE
CERTIFICATE OF CORRECTION

PATENT NO.      : 9,228,109 B2
APPLICATION NO. : 13/803618
DATED           : January 5, 2016
INVENTOR(S)     : Xueting Qiu et al.

It is certified that error appears in the above-identified patent and that said Letters Patent is hereby corrected as shown below:

In the specification
Column 1, line 8: After "Application", insert -- , --.
Column 6, line 9: Change "ofVOC's," to -- of VOCs, --.
Column 11, line 48: After "according", insert -- to --.
Column 12, line 7: Change "-trimethy-" to -- -trimethyl- --.
Column 13, line 7: Change "Microfluids" to -- Microfluidics --.
Column 13, line 24: Change "8 30" to -- 8 to 30 --.
Column 13, line 25: Change "15 20" to -- 15 to 20 --.
Column 16, line 1: Change "FeF3" to -- $FeF_3$ --.
Column 16, line 27: Change "by performed" to -- be performed --.
Column 16, line 66: Change "1 240° C.," to -- 240° C., --.
Column 18, line 15: Change "in)" to -- m) --.
Column 20, line 8: Change "item" to -- Item --.
Column 20, Table 1: Change "grams" to -- Grams --.
Column 20, line 35: Change "item i and j" to -- Item (i) and (j) --.
Column 20, Table 2: After "k", insert -- l m --.
Column 20, Table 2: After "$Fe^{2+}$", delete "l m".
Column 20, Table 2: Change "grams" to -- Grams --.
Column 21, Table 3: After "h", insert -- i --.
Column 21, Table 3: After "EA", delete "i".
Column 21, Table 3: Change "grams" to -- Grams --.
Column 21, line 11: Change "items" to -- Items --.
Column 22, Table 4: After "h", insert -- i --.
Column 22, Table 4: After "EA", delete "i".
Column 22, line 28: Change "items" to -- Items --.
Column 22, Table 5: Change "A" to -- a --.
Column 22, Table 5: Change "B" to -- b --.
Column 22, Table 5: After "k", insert -- l --.
Column 22, Table 5: After "$Fe^{2+}$", delete "l".

Signed and Sealed this
Twenty-third Day of August, 2016

Michelle K. Lee
*Director of the United States Patent and Trademark Office*

CERTIFICATE OF CORRECTION (continued)
U.S. Pat. No. 9,228,109 B2

Column 22, line 54: After "(CTA)", insert -- ) --.
Column 22, Table 6: After "h", insert -- i --.
Column 22, Table 6: After "EA", delete "i".
Column 23, line 36: Change "Non-Mini-Emulsion" to -- non-mini-emulsion --.
Column 23, line 46: Change "75 C." to -- 75° C. --.
Column 23, line 48: Change "Emulsion" to -- emulsion --.